United States Patent [19]

Teel, Sr. et al.

[11] Patent Number: 5,169,179
[45] Date of Patent: Dec. 8, 1992

[54] ADAPTER FOR CONNECTING A PLASTIC PIPE TO A METAL PIPE

[76] Inventors: Mark A. Teel, Sr., Box 4750, Healdton, Okla. 73438; Paul D. Martin, Box 172, Graham, Okla. 73437

[21] Appl. No.: 791,822

[22] Filed: Nov. 13, 1991

[51] Int. Cl.⁵ .............................................. F16L 35/00
[52] U.S. Cl. ...................................... 285/40; 285/174
[58] Field of Search ................... 285/40, 239, 174, 251

[56] References Cited

U.S. PATENT DOCUMENTS

| | | | |
|---|---|---|---|
| 826,678 | 7/1906 | Marks | 285/251 X |
| 1,349,586 | 8/1920 | Siegel | 285/251 |
| 4,113,288 | 9/1978 | Cox | 285/174 |

FOREIGN PATENT DOCUMENTS

| | | | |
|---|---|---|---|
| 253751 | 6/1926 | United Kingdom | 285/251 |
| 2098692 | 11/1982 | United Kingdom | 285/40 |

OTHER PUBLICATIONS

Price List Sheet, Central Plastics Company, 1990, Transition Fitt.
Brochure, Double O Seal Transition Fittings, 1990.
Brochure, Central Plastics Company, Fusion Equipment, 1990.
Sketch A, Adapter for Fiberglass Pipe.

Primary Examiner—Dave W. Arola
Attorney, Agent, or Firm—Dunlap, Codding & Lee

[57] ABSTRACT

An adapter for connecting a plastic pipe to a metal pipe. The adapter consists of a connector having a first end and a second end with an opening extending through the second end of the connector and extending a distance through the connector toward the first end of the connector forming an inner peripheral surface. The second inner peripheral surface of the connector is threaded forming a second inside diameter of the connector which is smaller than an outside diameter of the plastic pipe. The end of the plastic pipe is threaded into the opening through the first end of the connector with the threads digging into an outer peripheral surface of the plastic pipe and compressing a portion of the plastic pipe near the first end thereof for connecting the plastic pipe to the connector. The second end of the connector is adapted to be connected to one end of the metal pipe.

7 Claims, 1 Drawing Sheet

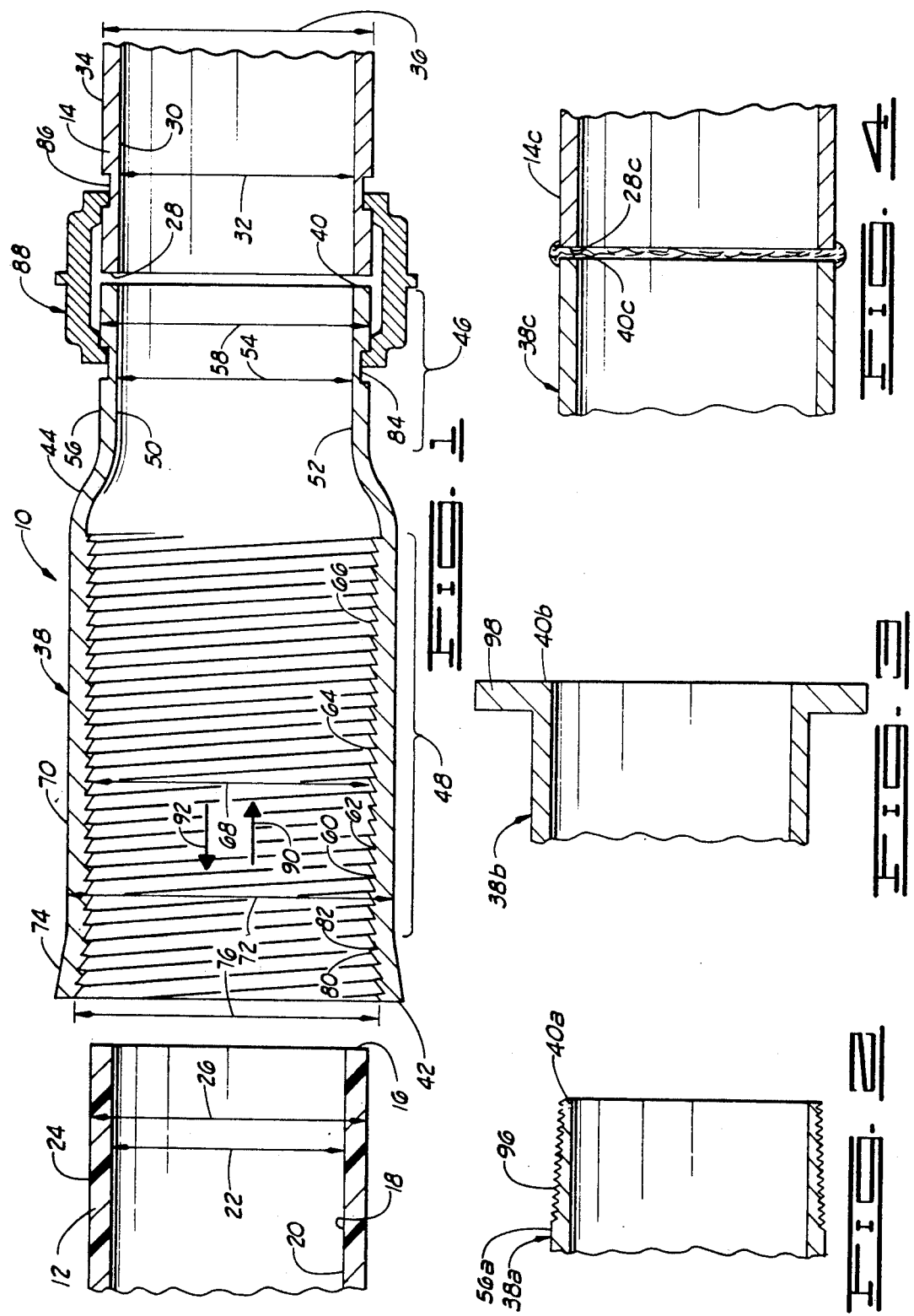

ADAPTER FOR CONNECTING A PLASTIC PIPE TO A METAL PIPE

FIELD OF THE INVENTION

The present invention relates generally to adapters for connecting one end of a plastic pipe to one end of a metal pipe and, more particularly, but not by way of limitation, to an adapter comprising a connector wherein an inside diameter of the connector is smaller than the outside diameter of the plastic pipe and the inside diameter of the connector is threaded so that, as the plastic pipe is threadedly disposed into the connector, the plastic pipe is compressed in the connector and the threads in the connector are dug or forced into the plastic pipe for connecting the one end of the plastic pipe to the connector, the opposite end of the connector being connected to the metal pipe.

BRIEF DESCRIPTION OF THE DRAWINGS

FIG. 1 is a sectional view of an adapter constructed in accordance with the present invention and a sectional view of a portion of a plastic pipe to be connected to the adapter, the end of the adapter opposite the end connected to the plastic pipe being adapted to be connected to one end of the metal pipe and a portion of a metal pipe being shown in section.

FIG. 2 is a sectional view of a portion of a modified adapter, similar to the adapter shown in FIG. 1, but showing a threaded end on the adapter for connection to a threaded end of a metal pipe (not shown).

FIG. 3 is similar to FIG. 2 but showing a modified adapter having one end with a flange thereon for connection to a flanged end of a metal pipe (not shown).

FIG. 4 is a view similar to FIG. 3, but showing a modified adapter having an end adapter to be welded to one end of a metal pipe, a portion of the metal pipe being shown in section.

DESCRIPTION OF THE PREFERRED EMBODIMENTS

Shown in FIG. 1 and designated by the reference numeral 10 is an adapter which is constructed in accordance with the present invention for connecting one end of a plastic pipe 12 to one end of a metal pipe 14. Only a fragmentary portion of the plastic pipe 12 and only a fragmentary portion of the metal pipe 14 are shown in FIG. 1. The plastic pipe 12 may be constructed of a polyethylene for example.

The plastic pipe 12 has a first end 16 with an opening 18 extending through the first end 16 and extending a distance through the plastic pipe 12 forming an inner peripheral surface 20. The inner peripheral surface 20 forms a plastic pipe inside diameter 22 of the plastic pipe 12. The plastic pipe 12 also has an outer peripheral surface 24 forming a plastic pipe outside diameter 26. The outer peripheral surface 24 of the plastic pipe 12 is unthreaded. The plastic pipe 12 is generally cylindrically shaped.

The metal pipe 14 has a first end 28 with an opening extending through the first end 28 and extending a distance through the metal pipe 14 forming an inner peripheral surface 30. The inner peripheral surface 30 forms a metal pipe inside diameter 32. The metal pipe 14 also has an outer peripheral surface 34 forming a metal pipe outside diameter 36.

The adapter 10 comprises a connector 38 having a first end 40 and a second end 42. The connector 38 is tapered outwardly at 44 (sometimes referred to herein as a tapered portion 44) to form a first portion 46 of the connector 38 extending from the first end 40 toward the second end 42 terminating with the tapered portion 44 and a second portion 48 extending from about the second end 42 a distance toward the first end 40 terminating with the tapered portion 44.

An opening 50 extends through the first end 40 of the connector 38 with the opening 50 extending through the first portion 46 and forming a first inner peripheral surface 52 with a first inside diameter 54. The first portion 46 has a first outer peripheral surface 56 forming a first outside diameter 58.

An opening 60 is formed through the second end 42 of the connector 38 and the opening 60 extends through the second portion 48 of the connector 38 forming a second inner peripheral surface 62. A plurality of threads 64 are formed on the second inner peripheral surface 62 with each of the threads 64 extending a distance radially inwardly terminating with outer thread ends 66. The outer thread ends 66 form a second inside diameter 68. The second portion 48 has a second outer peripheral surface 70 forming a second outside diameter 72.

The second end 42 of the connector 38 is flared outwardly to form a flared portion 74 which extends from the second end 42 to the second portion 48. In one preferred form, the threads 64 extend over the inner peripheral surface of the flared portion 74, as shown in FIG. 1. The flared portion 74 has a third inside diameter 76 extending between the outer thread ends 66 and being disposed at the second end 42 of the connector 38. The flared portion 74 extends outwardly from the second portion 48 with the opening 60 extending through the flared portion 74. The threads 64 extend through the flared portion 74.

The second inside diameter 68 remains about the same throughout the entire length of the second portion 48. The second inside diameter 68 is less than the plastic pipe inside diameter 22. Preferably, the second inside diameter 68 is in a range of about 0.10 inches to about 0.25 inches less than the plastic pipe outside diameter 26. The third inside diameter 76 is slightly greater than the plastic pipe outside diameter 26.

The threads 64 preferably are a buttress style of threads having an angled edge facing the second end 42 of the connector 38 and a perpendicularly extending edge 82 generally facing the first end 40 of the connector 38. In a preferred form, the threads 64 having a pitch in a range from about 12 threads per inch to about 20 threads per inch. In general, the pitch (threads per inch) increases as the second inside diameter 68 decreases.

In one embodiment, for a two inch standard pipe, the plastic pipe outside diameter 26 is about 2.400 inches, the second inside diameter 68 is about 2.300 inches, the first outside diameter 58 is about 2.375 inches and the first inside diameter 54 is about 2.050 inches, and the third inside diameter 76 is about 2.450 inches. The plastic pipe 12 is a polyethylene pipe. The connector 38 is constructed of stainless steel.

In one embodiment, a 304 stainless steel pipe was utilized to construct the connector 38. The pipe was then cut on a bandsaw into 6¼ inch sections. The sections then were chucked up in a horizontal lathe and each end of the section was machined and squared. The section was removed from the lathe and placed in a vertical hydraulic press. A mandrel was pressed into the section under approximately 60 tons of pressure using a special anti-siege compound on both parts. The swaging process formed the second portion 48 of the connector 38. The section then was removed and returned to the lathe for the finish machine work. The threads 64 then were formed in the second inner peripheral surface 62.

The connector 38 is a single, unitary piece of metal, as opposed to being two or more separate pieces welded or otherwise connected together. The connector 38 may be formed from a pipe as described above or the connector may be cast.

As shown in FIG. 1, a groove 84 is formed in the first outer peripheral surface 56 with the groove 84 extending circumferentially about the first portion 46. The groove 84 is spaced a distance from the first end 40 of the connector 38.

Another groove 86 is formed in the metal pipe 14 spaced a distance from the first end 28 of the metal pipe 14. The groove 86 is formed in the outer peripheral surface 34 of the metal pipe 14 and the groove 86 extends circumferentially about the metal pipe 14.

A coupling 88 is connected to the metal pipe 14 and to the connector 38 by way of the grooves 84 and 86 for connecting the connector 38 to the metal pipe 14. As diagrammatically illustrated in FIG. 1, the coupling 88 is of the type manufactured by Victaulic Company of America, South Plainfield, N. J., with such couplings being commercially available and well known in the art.

In operation, the first end 16 of the plastic pipe 12 is disposed in the flared portion 74 with the outer peripheral surface 24 of the plastic pipe 12 engaging the threads 64 and the flare portion 74. In this position, the plastic pipe 12 is moved in a direction 90 generally from the second end 42 toward the first end 40 of the connector 38 while simultaneously rotating the connector 38 in a clockwise direction. In this manner, as the plastic pipe 12 is moved in the direction 90, the threads 64 engage and dig in or are forced into the outer peripheral surface 24 of the plastic pipe 12 and the portion of the plastic pipe 12 disposed in the opening 60 in the second portion 48 of the connector 38 is compressed since the second inside diameter 68 is smaller than the plastic pipe outside diameter 26. The plastic pipe 12 is moved in the direction 90 and the connector 38 rotated in the clockwise direction until the first end 16 of the plastic pipe 12 is disposed generally near the end of the second portion 48 of the connector 38 or, in other words, until the plastic pipe 12 extends substantially through the entire second portion 48. In this position, the connector 38 is securely connected to the plastic pipe 12.

In the connected position of the plastic pipe 12 to the connector 38, the threads 64 have been dug or forced into the outer peripheral surface 24 of the plastic pipe 12 and the perpendicularly extending edges 82 of the threads 64 engage the plastic pipe 12 and cooperate to prevent the plastic pipe 12 from being withdrawn or removed from the connector 38 in a direction 92, which is generally opposite the direction 90. Further, the compression of the plastic pipe 12 as the plastic pipe 12 is moved into the opening 60 in the second portion 48 due to the second inside diameter 68 being smaller than the plastic pipe outside diameter 26 cooperates to secure the plastic pipe 12 in a position connected to the connector 38, without the necessity of using epoxy or adhesive.

The connector 38 is securely connected to the plastic pipe 12 without the necessity of using any adhesive or epoxy to facilitate the connection or, in other words, with the threads 64 and the compression of the portion of the plastic pipe 12 within the second portion 48 providing the sole and only means for the connection of the connector 38 to the plastic pipe 12.

After the connector 38 has been connected to the plastic pipe 12, the metal pipe 14 then can be connected to the connector 48 by way of the coupling 88 in a manner well known in the art.

EMBODIMENT OF FIG. 2

Shown in FIG. 2 is a portion of a modified connector 38a. The modified connector 38a is constructed exactly like the connector 38 described in detail before, except threads 96 are formed on a portion of the first outer peripheral surface 56a generally near the first end 40a.

The modified connector 38a will operate exactly like the connector 38 described in detail before, except the first portion of the modified connector is adapted to be threadedly connected to a metal pipe (not shown) via the threads 96 in lieu of using a coupling type connection such as the coupling 88 shown in FIG. 1 and described in detail before. In this embodiment, the metal pipe also would be modified to include a threaded inner peripheral surface for connection to the threads 96, rather than a groove in the outer peripheral surface such as the groove 86.

EMBODIMENT OF FIG. 3

Shown in FIG. 3 is a modified connector 38b which is constructed exactly like the connector 38 shown in FIG. 1, except the connector 38b shown in FIG. 3 has a flange 98 formed on the first end 40b of the connector 38 in lieu of a groove like the groove 84 on the connector 38 shown in FIG. 1. In this embodiment, the metal pipe (not shown) also would have a mating flange and the connector 38b would be connected to the metal pipe by way of a flange connection including the flange 98.

EMBODIMENT OF FIG. 4

Shown in FIG. 4 is another modified connector 38c constructed exactly like the connector 38 shown in FIG. 1, except the connector 38c shown in FIG. 4 does not have a groove like the groove 84 on the connector 38. Rather, the connector 38c shown in FIG. 4 is moved to a position wherein the first end 40c generally abuts the first end 28c of a metal pipe 14c and the first end 40c of the connector 38c is weldingly connected to the first end 28c of the metal pipe 14c.

Changes may be made in the construction and the operation of the various components, elements and assemblies described herein without departing from the spirit and scope of the invention as defined in the following claims.

What is claimed is:

1. An adapter for connector to a plastic pipe having a first end, an opening extending through the first end forming an inner peripheral surface and providing a plastic pipe inside diameter, and an outer peripheral surface providing a plastic pipe outside diameter, the outer peripheral surface of the plastic pipe being unthreaded, the adapter also being adapted for connection to a metal pipe having a first end, an opening extending through the first end forming an inner peripheral surface and providing a metal pipe inside diameter and an outer peripheral surface providing a metal pipe outside diameter, the adapter comprising:

a connector having a first end and a second end, a portion of the connector generally between the first and the second ends thereof being tapered outwardly forming a tapered portion, the connector having a first portion extending generally between the first end of the connector and the tapered portion and a second portion extending generally between a position near the second end of the connector and the tapered portion, an opening extending through the first portion of the connector providing a first inner peripheral surface and forming a first inside diameter, the first portion having an outer peripheral surface providing a first outside diameter, an opening being formed through the second portion, providing a second inner peripheral surface and the second portion having an outer peripheral surface forming a second outside diameter, a plurality of threads being formed on the second inner peripheral surface with each of the threads extending a distance radially inwardly from the second inner peripheral surface terminating with outer thread ends and forming a second inside diameter extending between the outer thread ends of the threads formed on the second inner peripheral surface, the second inside diameter being less than the plastic pipe outside diameter, the first end of the plastic pipe being inserted into the opening the second portion of the connector and the connector being rotated with the threads in the second portion engaging and digging into the outer peripheral surface of the plastic pipe as the connector is rotatingly moved to a position wherein a portion of the plastic pipe extends through substantially the entire second portion of the connector being compressed due to the second inside diameter being less than the plastic pipe outside diameter and the threads digging into the outer peripheral surface of the plastic pipe for connecting the first end of the plastic pipe to the connector and substantially preventing removal of the plastic pipe from the connector, and the first portion of the connector being adapted to e connected to the first end of the metal pipe.

2. The adapter of claim 1 wherein the second inside diameter is in a range from about 0.10 inches to about 0.25 inches less than the plastic pipe outside diameter.

3. The adapter of claim 1 wherein the connector is a single, unitary piece of metal.

4. The adapter of claim 1 wherein the threads on the second inner peripheral surface of the connector are defined further as being buttress style threads having an angled edge facing the second end of the connector and a perpendicularly extending edge facing the first end of the connector.

5. The adapter of claim 4 wherein the threads have a pitch in a range from about 12 threads per inch to about 20 threads per inch.

6. The adapter of claim 1 wherein a portion of the connector near the second end of the connector is flared outwardly to form a flared portion with the opening in the second portion extending through the flared portion and the threads on the second portion extending through the flared portion forming a third inside diameter at the second end of the connector with the third inside diameter extending between the outer thread ends at the second end of the connector, the third inside diameter being greater than the plastic pipe outside diameter.

7. The adapter of claim 1 wherein the threads in the second portion of the connector and the compression of the portion of the plastic pipe disposed in the second portion of the connector provide the only means for connecting the plastic pipe to the connector.

* * * * *

UNITED STATES PATENT AND TRADEMARK OFFICE
CERTIFICATE OF CORRECTION

PATENT NO. : 5,169,179
DATED : December 8, 1992
INVENTOR(S) : Mark A. Teel, Sr.; Paul D. Martin It is certified that error appears in the above-identified patent and that said Letters Patent is hereby corrected as shown below:

Column 5, line 25, after opening, insert --in--.

Column 6, line 3, after to, delete "e" and substitute therefore --be--.

Signed and Sealed this

Twenty-sixth Day of October, 1993

Attest:

BRUCE LEHMAN

Attesting Officer    Commissioner of Patents and Trademarks